United States Patent
Sethi et al.

(10) Patent No.: US 7,636,313 B2
(45) Date of Patent: Dec. 22, 2009

(54) USE OF INTERNAL BUFFER TO REDUCE ACKNOWLEDGEMENT RELATED DELAYS IN ACKNOWLEDGEMENT-BASED RELIABLE COMMUNICATION PROTOCOLS

(75) Inventors: Bhupinder Sethi, Redmond, WA (US); Jeffrey Che Fuller, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1162 days.

(21) Appl. No.: 10/745,200

(22) Filed: Dec. 23, 2003

(65) Prior Publication Data
US 2005/0135394 A1  Jun. 23, 2005

(51) Int. Cl.
*H04L 12/26* (2006.01)
(52) U.S. Cl. .................................. 370/236; 370/412
(58) Field of Classification Search .................. None
See application file for complete search history.

(56) References Cited

U.S. PATENT DOCUMENTS 7,190,669 B2 * 3/2007 Banerjee ..................... 370/229
2003/0156093 A1 * 8/2003 Niida et al. ................. 345/156
2005/0055406 A1 * 3/2005 Singhai et al. .............. 709/206

OTHER PUBLICATIONS

Evaluation for TCP With Delayed ACK Option in Wireless Multi-Hop Networks Xu, Shugong ; Saadawi, Tarek 2001 IEEE p. 267-271.
Improving TCP Performance in Multipath Packet Forwarding Networks Youngseok Lee, Ilkyu Park, and Yanghee Choi vol. 4, No. 2, Jun. 2002 p. 148-271.

* cited by examiner

*Primary Examiner*—Daniel J Ryman
*Assistant Examiner*—Tito Pham
(74) *Attorney, Agent, or Firm*—Workman Nydegger

(57) ABSTRACT

Mechanisms in which reliable communication is enabled without having to wait for a final acknowledgement message. An upper layer issues a send request. The message is then placed in a send queue. If data in the send queue is less than (or equal to) a predetermined threshold at this stage, the packet is sent, a successful transmission report is returned to the caller, and the data is copied to an internal buffer for use in case transmission was unsuccessful. If the amount of data in the send queue is more than that predetermined threshold, the packets are sent. Subsequently, each time an acknowledgement is received, the determination is repeated until the amount of unacknowledged data in the send queue is less than or equal to the predetermined threshold. Then, the successful transmission report is returned to the caller.

35 Claims, 3 Drawing Sheets

USE OF INTERNAL BUFFER TO REDUCE ACKNOWLEDGEMENT RELATED DELAYS IN ACKNOWLEDGEMENT-BASED RELIABLE COMMUNICATION PROTOCOLS

BACKGROUND OF THE INVENTION

1. The Field of the Invention

The present invention relates to network communication technology. More specifically, the present invention relates to mechanisms for using an internal buffer other than the send queue to reduce acknowledgement related delays in acknowledgement-based reliable communication protocols.

2. Background and Related Art

Computing technology has transformed the way we work and play. Much of the functionality of computing systems is derived from the ability of computing systems to communicate one with another over a network. For example, e-mail, instant messaging, Web navigation, and many other common applications rely on network communication. In order to so communicate, it is important that the sending and receiving computing system follow compatible protocols governing communication.

Many protocols limit the amount of data that can be transmitted in a single packet. Accordingly, if a computing system is to send more data than is permitted in a single packet, then the computing system uses the protocol to break the send data into multiple packets having appropriate headers. For example, Transmission Control Protocol (TCP) and Internet Protocol (IP) packetize send data if needed.

Unfortunately, there are several realistic failure mechanisms whereby a packet transmitted on a network may never be received at its intended destination. However, some applications require a high degree of reliability when communicating with another computing system. In order to improve reliability of communications, some communication protocols use acknowledgement messages whereby the receiving computing system sends acknowledgement packets to the sending computing system to properly acknowledge receipt of one or more packets. The sending computing system considers the send-operation complete once the sending computing system receives one or more acknowledgements of receipt that collectively acknowledge all of the packets in the message.

Previously, reliable communication protocols had sent an acknowledgement packet for every packet sent. However, to reduce network traffic (and to give a chance to piggyback the acknowledgement on data in the reverse direction), commonly used reliable communication protocols, such as TCP, typically requires acknowledgement of every two packets, and even permits acknowledgement of more than two packets. Accordingly, when the receiving computing system receives a first packet since the last acknowledgement for a given connection (or the first packet since the connection was established), then the reliable communication protocol will typically have the receiving computing system wait for one or more other packets on the connection before an acknowledgment packet is sent.

However, sometimes, the single packet received since the last acknowledgement may be the last packet in a message, or the single packet received over the connection may be the only packet in the message. In either case, another packet for the message will not be received. To accommodate this common scenario, some reliable communication protocols such as TCP send an acknowledgement for a single packet if a subsequent packet has not been received over the connection for a certain amount of time whereby it appears that the single packet is the last or only packet for a message. The TCP implementation in Windows, for example, waits for 200 milliseconds on average since the last packet received before sending an acknowledgement message for a single packet. Other TCP implementations may wait for even longer.

This final waiting time is significant in terms of how long it takes to send a packet. In many cases, the final waiting time for the final packet is longer than the transmission time for all other packets in the message combined. Accordingly, the module or application that initiated the message has to wait this additional time before it can consider the send-operation complete.

One conventional way of reducing this wait time is to immediately write a message into an internal buffer, and then immediately return a send complete indication to the module or application that initiated the send. Packets are constructed from the internal buffer as they are ready to be sent. As packets are acknowledged, the data is removed from the internal buffer.

This conventional method has definite benefits. In particular, the calling module or application that made the send request is immediately returned a send complete message and thus may perform other actions. Unfortunately, the send complete indication is somewhat unreliable. After all, none or very little of the message may actually have been sent before the send complete indication is made. It may be that packets cannot be transmitted successfully. However, the calling application was informed of a successful send, and thus may take erroneous actions based on the false assumption of a successful send. In addition, the conventional method incurs significant processing and memory costs since all send data will be copied and stored by the transport protocol.

Accordingly, what would be advantageous are mechanisms in which the delay due to the final acknowledgement is reduced or even eliminated while still retaining reliability and performance.

BRIEF SUMMARY OF THE INVENTION

The foregoing problems with the prior state of the art are overcome by the principles of the present invention, which are directed towards mechanisms in which reliable communication is enabled between a sending computing system and a receiving computing system that are capable of communicating with each other using a reliable communication protocol. In accordance with this reliable protocol, if a message to be sent is greater than a certain size, the message is broken into multiple packets. To ensure reliability, the receiving computing system typically sends acknowledgement packets to the sending computing system to acknowledge successful receipt of every two or more sent packets.

Upon receiving a request to send a message, the reliable communications protocol of the sending computing system places the message into a send queue. At this stage, the sending computing system evaluates whether or not there is less than (or equal to) a predetermined threshold in the send queue (inclusive of the message which was just placed in the send queue).

If it is determined that there is not less than the predetermined threshold in the send queue, the sending computing system sends as many packets as possible over a connection to the receiving computing system. Depending on the number of packets sent, the sending computing system would then receive one or more acknowledgement packets indicating successful transmission. Each time an acknowledgement packet is received, the sending computing system evaluates whether the data remaining in the send queue is less than (or equal to) the predetermined threshold. For a given acknowledgement packet, if the unacknowledged data in the send queue is still not less than (or equal to) the predetermined threshold, then the computing system awaits the next acknowledgement packet. This process repeats until the acknowledgements received so far result in the data in the send queue being less than (or equal to) the predetermined threshold.

Once this occurs, the sending computing system copies any remaining data into an internal buffer, and responds to the request to send the message with an indication that transmission of the message is complete. This indication may be made without waiting for the final acknowledgement to be received. If a copy was made, it may be removed from the internal buffer after the final acknowledgement packet is received acknowledging receipt of the final packet. Note that the reliable transport protocol must have access to a copy of any unacknowledged data since a retransmission of that data may be required.

On the other hand, if, after placing the message into the message queue, the data in the send queue is less than (or equal to) the predetermined threshold, the sending computing system immediately copies the remaining data into an internal buffer, and responds to the request to send the message with an indication that transmission of the message is complete.

The principles of the present invention reduce the amount of copying that needs to occur to and from the internal buffer as compared to the above-described conventional method. In some cases, no copying will occur at all. Furthermore, the size of the internal buffer may be made small. In addition, reliability is improved since a send complete indication is made only after part of the message has been sent and acknowledged in the multi-packet case, or only when the message has been sent out in the single-packet case. Accordingly, the delay due to the final acknowledgement is eliminated while preserving processing and memory resources associated with the copying that may be needed to reliably eliminate this delay.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
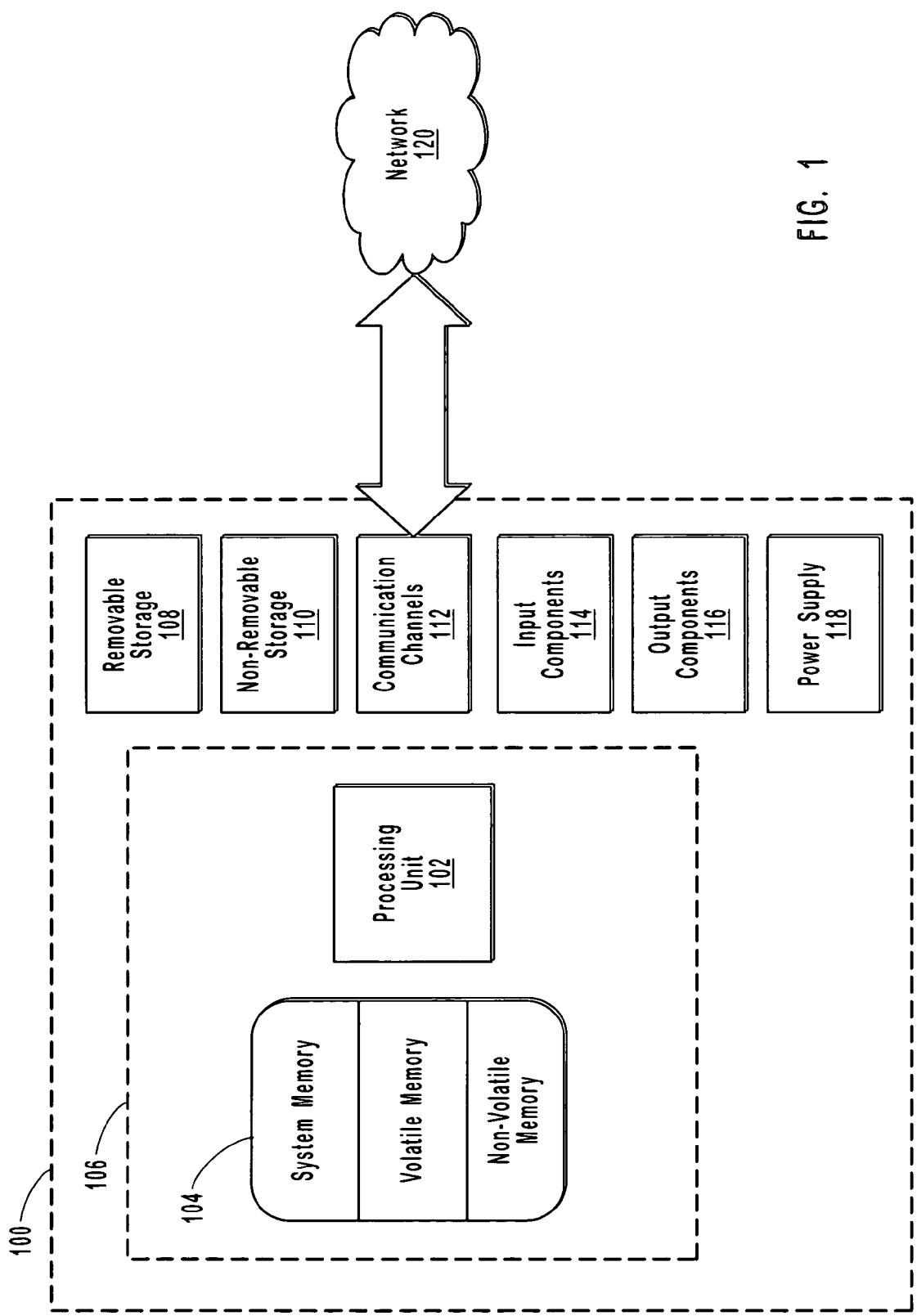
FIG. 1 illustrates a suitable computing system that may implement the features of the present invention.

The principles of the present invention relate to mechanisms in which reliable communication is enabled without having to wait too long for a final acknowledgement message. At the same time, the processing and memory overhead to enable such communication is kept minimal. An upper layer issues a request to send a message to the reliable communication protocol. The message is then placed in a send queue. At that point, if there is less than (or equal to) a predetermined threshold in the send queue, the packet is sent, the data from the send queue is copied to an internal buffer for use in case transmission was unsuccessful, and a successful transmission report is returned to the caller. If the amount of unacknowledged data in the send queue is more than that predetermined threshold, the packets are sent. Subsequently, each time an acknowledgement is received, it is evaluated whether the data in the send queue is less than (or equal to) the predetermined threshold. If yes, any unacknowledged data from the send queue is copied to the internal buffer, and the successful transmission report is returned to the caller.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

For descriptive purposes, FIG. 1 shows a schematic diagram of an example computer architecture usable for these devices. The architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices. Communication channels 112 are examples of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
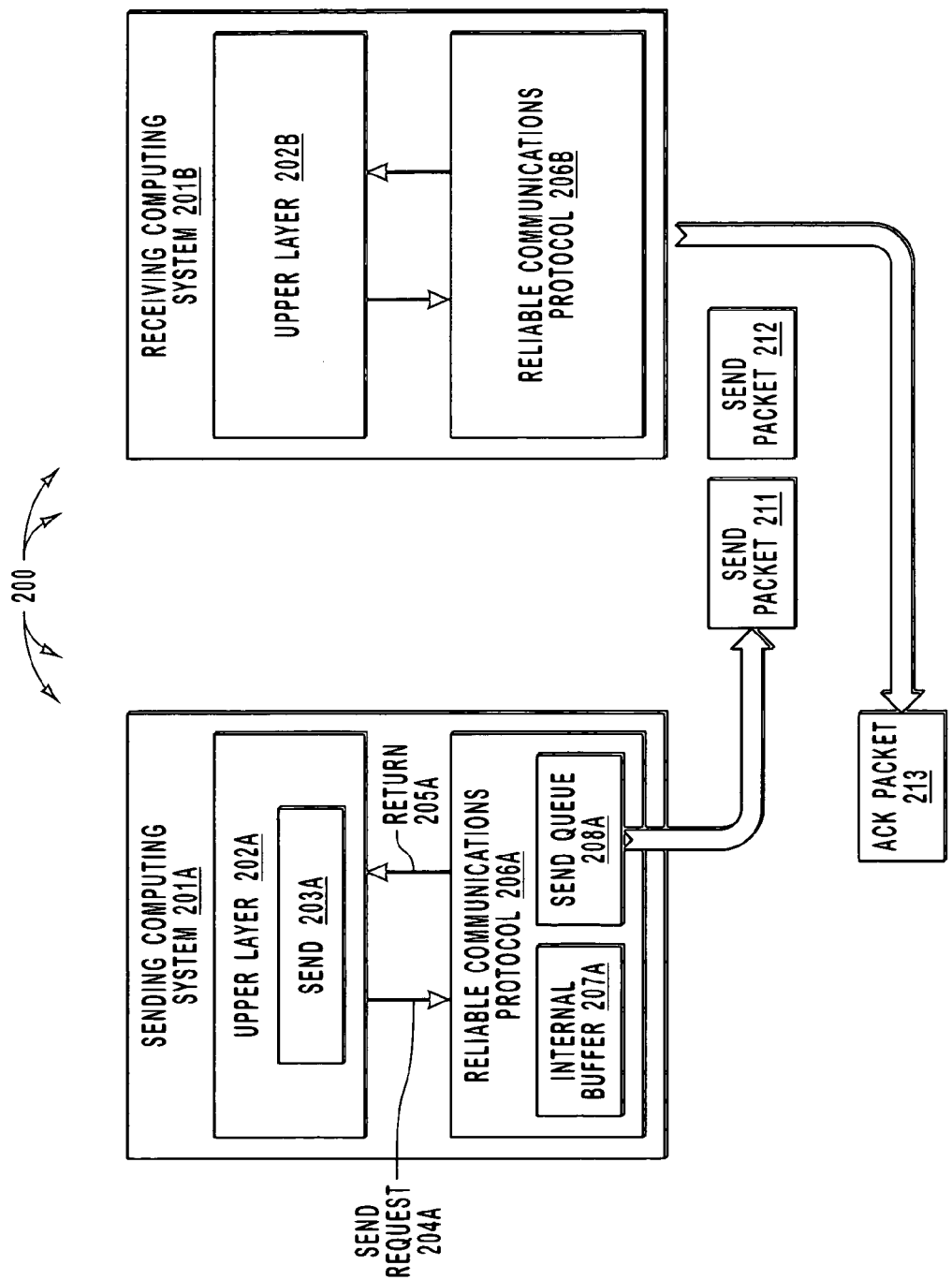
FIG. 2 illustrates a network environment in which the principles of the present invention may be employed.

FIG. 2 illustrates a network environment 200 in which the present invention may be employed. The network environment 200 includes a sending computing system 201A and a receiving computing system 201B. In the illustrated example, an upper layer module 202A in the sending computing system 201A is to communicate a message 203A to an upper layer module 202B in the receiving computing system 201B.

The sending computing system 201A and the receiving computing system 201B are capable of communicating with each other using a reliable communications protocol. For example, the sending computing system 201A uses a reliable communications protocol 206A for transmitting the message 203A to the receiving computing system 201B. Likewise, the receiving computing system 201B uses a reliable communication protocol 206B to receive the message 203A. In bi-directional reliable communications, the reliable communication protocols modules 206 on both the sending and receiving computing system will have the capability to both send and receive messages reliably. The reliable communications protocols 206A and 206B reside underneath the upper layers 202A and 202B respectively in the protocol stack. This is the only reason why the upper layers 202 are referred to with the modifier "upper". The upper modules may be an application or any other module or component.

In order to send the message 203A, the reliable communications protocol 206A receives a send request 204A from the upper layer module 202A. If the message 203A cannot be sent in a single packet over the network, then the reliable communications protocol 206A queues up the request for sending in a send queue 208A maintained by the reliable communications protocol 206A. The reliable communications protocol 206A then segments the message into multiple packets with appropriate headers needed for routing and reassembly, and sends the packets to the receiving computing system 201B. In order to have reliable communications, the reliable communications protocol 206B acknowledges the received packets. When all packets containing data from a particular send-request have been acknowledged, the request is removed from the send queue, and an appropriate indication of completion is sent to the upper layer. In order to reduce network traffic, the acknowledgment is provided for every two or more packets during steady state. For example, sending computing system 201A transmits packets 211 and 212, and receives the resulting acknowledgement packet 213.

Examples of such reliable communication protocols 206A that use acknowledgment of every two or more send packets to ensure reliability are, for example, Transmission Control Protocol (TCP) or a module such as D-PLAY that imposes acknowledgement reliability over User Datagram Protocol (e.g., UDP). However, the principles of the present invention may apply to any reliable communications protocol that use acknowledgement messages for every two or more sent packets in steady state.

As previously mentioned, one issue with this acknowledgment technique is that sometimes a message may be contained inside a single packet, or sometimes the packet prior to the last packet for the message is the one that was acknowledged. In either of these two cases, the sending computing system is going to send only one more packet for the message. Accordingly, if the receiving computing system strictly follows the normal rules of acknowledging only every two packets, the receiving computing system would wait forever for the next packet for the message. This next packet for the message would never arrive since the last received packet was the only or final packet in the message.

To avoid this situation, conventional reliable communication protocols such as TCP send an acknowledgement packet for even a single packet after unsuccessfully waiting a predetermined time after receiving the last packet for the next packet to arrive. Such an acknowledgement is called a "delayed acknowledgement". Unfortunately, this final wait for the acknowledgement message can take a significant portion of the overall transmission time for the message as a whole.

One conventional way of reducing this wait time is to immediately write a message into an internal buffer such as internal buffer 207A, and then immediately issue a send complete indication to the module or application that initiated the send. Packets are constructed from the internal buffer as they are ready to be sent. As packets are acknowledged, the packets are removed from the internal buffer and from the send queue. Unfortunately, this send complete indication is somewhat unreliable. After all, none or very little of the message may actually have been sent before the send complete indication is made. If the connection was terminated after the send-complete indication had been made, the data will never be sent, yet the reliable communication protocol has notified another component of the completion of that send-request. In addition, performance suffers due to the processing and memory overhead associated with copying all outgoing data.

Figure 3:
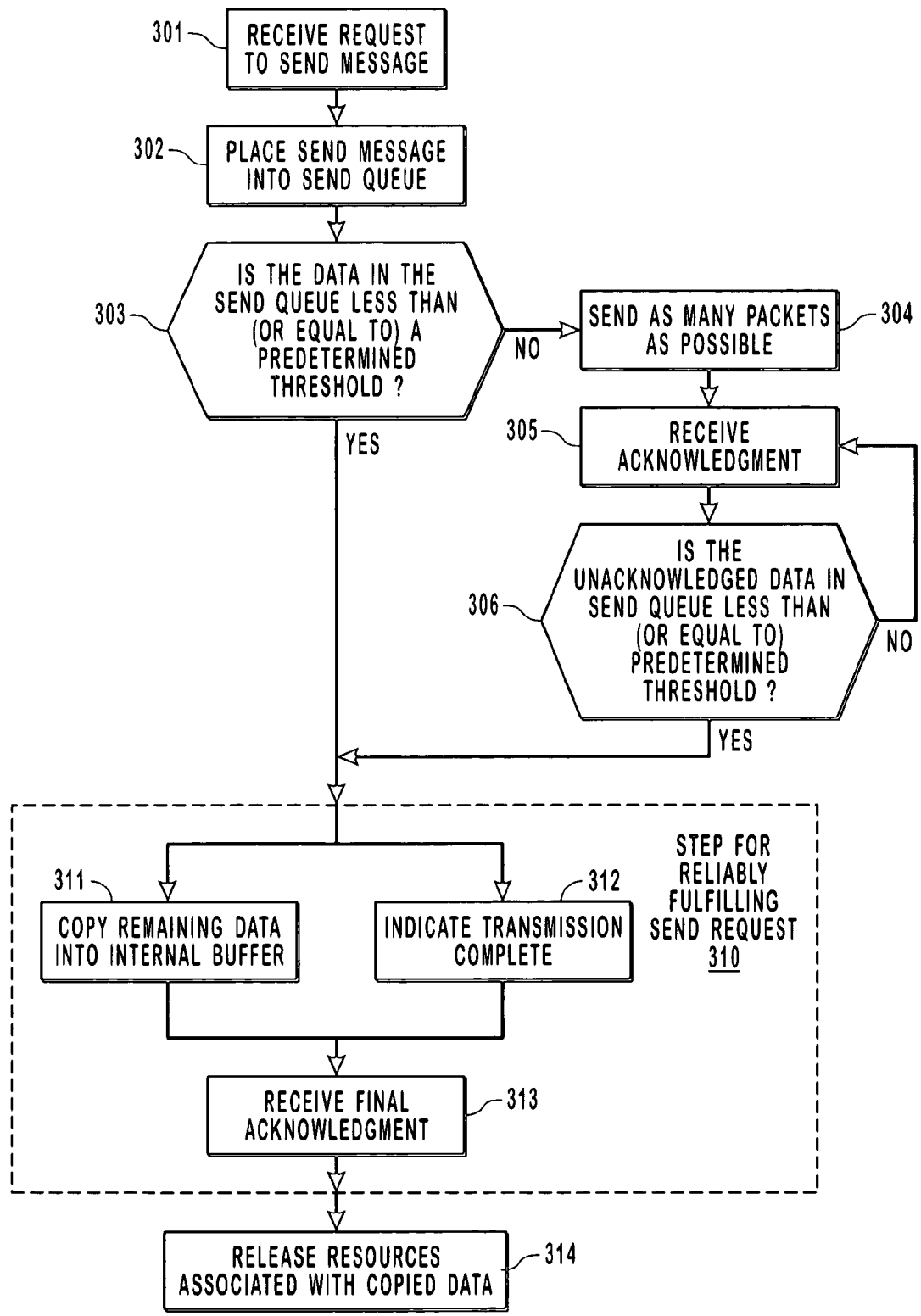
FIG. 3 illustrates a flowchart of a method for using an internal buffer to achieve reliable communication while reducing acknowledgement-related delay due to the final acknowledgement message.

FIG. 3 illustrates a flowchart of a method 300 for the sending computing system to quickly, efficiently and reliably send the message to the receiving computing system notwithstanding delayed acknowledgment for a single or final packet corresponding to the message. The method 300 may be performed whenever the reliable communication protocol 206A receives a request to send a message (act 301).

Upon receiving a request to send a message (act 301) (see the send request 204A of FIG. 2), the reliable communications protocol 206A places the message into a send queue (act 302) (see the send queue 208A). At this stage, the sending computing system determines whether or not the amount of data in the send queue (including the message that was just placed) is less than (or equal to) the predetermined threshold (decision block 303).

If the predetermined threshold were a single packet's worth of data, then a multi-packet message would result in there being more data than the predetermined threshold in the send queue (NO in decision block 303). As mentioned below, the method 300 includes the case of already having data in the send queue for a given connection when an additional message is added to the send queue. Accordingly, even a single packet message may still result in the amount of data in the send queue being more than the predetermined threshold if there was already data in the send queue.

This predetermined threshold may be one packet's worth of data. However, the predetermined threshold may also be more than one packet's worth of data. The higher the predetermined threshold required in decision block 303, the faster the calling module receives a successful transmission report. However, this is at the expense of some loss in reliability and performance. If the protocol's packet size is used as the predetermined threshold, the amount of copy processing and memory usage is kept low while totally eliminating the upper layer's need to wait for a delayed acknowledgement of the final packet.

If it is determined that the data in the send queue is more than the predetermined threshold (NO in decision block 303), then the sending computing system sends as many packets as possible over a connection to the receiving computing system (act 304). Depending on the number of packets sent, the sending computing system would then receive one or more acknowledgement packets indicating successful transmission.

Each time one of the acknowledgement packets is received (act 305), the sending computing system determines whether the unacknowledged data in the send queue is less than (or equal to) the predetermined threshold (decision block 306). For a given acknowledgement packet, if the unacknowledged data in the send queue is still more than the predetermined threshold (NO in decision block 306), then the computing system awaits the next acknowledgement packet. This process repeats until the acknowledgements received so far result in the unacknowledged data in the send queue being less than (or equal to) the predetermined threshold (YES in decision block 306).

Once this occurs, the sending computing system performs a functional, result-oriented step for reliably fulfilling the send request without waiting for a final acknowledgement (step 310). In the embodiment illustrated in FIG. 3, step 310 includes corresponding acts 311 through 313. Specifically, in response to the determination that the amount of unacknowledged data in the send queue is less than or equal to the predetermined threshold (YES in decision block 306), the sending computing system copies the remaining data, if any, into an internal buffer (act 311). The sending computing system also responds to the request to send the message with an indication that transmission of the message is complete (act 312). This indication may be made without waiting for the final acknowledgement to be received. If a copy was made, the protocol will release resources associated with the copied data (act 314) after the final acknowledgement packet acknowledging receipt of the final send packet is received from the computing system 201B (act 313). The releasing of resources associated with the copied data (act 314) may include, for example, ensuring that the data is no longer present in the send queue, and may also include freeing of the internal buffers in which the data was copied. The releasing of resources may even include the releasing of all resources associated with the copied data.

Accordingly, from the requesting upper layer's 201A viewpoint, the message 203A is sent more quickly since the final acknowledgement message is not waited for before considering the transmission to be complete. Furthermore, since one or more other acknowledgement packets have already been received related to the transmission of the message, it is more likely that the final packet will be received. Accordingly, the requesting upper layer may more reliably be able to assume successful completion as compared to the conventional method in which the requestor is informed of success in multi-packet sent messages even before a single acknowledgment is received. Furthermore, the entire message was not copied into the internal buffer, thereby reducing processing and memory overhead associated with copying data to and/or from the internal buffer. In some cases, no copying is needed at all.

The method 300 proceeds along a different process flow if, after placing the message into the message queue, the data in the send queue is less than the predetermined threshold (YES in decision block 303). If the predetermined threshold is a single packet's worth of data, then the message was a single-packet message. In this case, the method 300 proceeds immediately to the step for reliably fulfilling the send request without waiting for a final acknowledgement (step 310). Specifically, the sending computing system copies the remaining data into an internal buffer (act 311), responds to the request to send the message with an indication that transmission of the message is complete (act 312). Then only after responding to the request is the acknowledgement packet received acknowledging receipt of the final packet (act 313). Finally, the resources associated with the copied data may then be released (including ensuring that the copied data is no longer in the send queue, and may include freeing the internal buffers into which the data was copied) (act 314).

Accordingly, if the predetermined threshold is a single packet's worth of data, it is only when the message may be transmitted as a single packet that the sending computing system immediately informs the requestor that the message is successfully transmitted. This is in contrast to conventional mechanisms in which all of the message is immediately sent to the internal buffer regardless of how many packets are used to transmit the request. Since there is only a single packet to be transmitted, it is more likely that transmission will be successful. Accordingly, the representation that the message is transmitted may be more reliably made on average as compared to conventional methods.

Now that the requesting upper layer 301A is free to assume that the message is received prior to the final acknowledgement message being received, it is more likely that the upper layer 301A may cause additional messages to enter the send queue related to a different message using the same connection. This means that new messages may be added to the send queue at any moment after the upper layer is informed that the previous message is complete. However, the above-described method works regardless of whether there was already data in the send queue at the time additional messages are added.

If the per-connection internal buffer is only allocated while it is in use and is subdivided into portions each of half a packet size, then the total internal buffer memory usage after a copy operation may often be only one half a packet in size rather than a full packet size. Such an implementation reduces overall memory usage at the cost of processor time required for memory allocation operations. A "lookaside list" or similar data structure containing these buffers may be used to reduce memory allocation operations from a memory pool or heap, thereby reducing processing overhead. Alternatively, each transport connection may have its own dedicated internal buffer, eliminating the need to allocate before copy operations at the cost of constant memory usage associated with each connection.

Furthermore, the principles of the present invention reduce the amount of copying that needs to occur to and from the internal buffer as compared to the above-described conventional method. In addition, reliability is improved since a send complete message is sent only after one or more acknowledgment messages have been received in the multi-packet case, or only when the message may be sent in a single packet in the single-packet case. Accordingly, the delay due to the final acknowledgement is eliminated while Preserving processing and memory resources associated with the copying that may be needed to reliably eliminate this delay.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a network environment that includes a sending computing system and a receiving computing system that communicate with each other using a reliable communication protocol in which a message to be sent from the sending computing system to the receiving computing system is broken into a plurality of packets, and in which the receiving computing system acknowledges receipt of every two or more packets, a method for the sending computing system to quickly, efficiently and reliably send the message to the receiving computing system notwithstanding that acknowledgement of the final packet is delayed, the method comprising the following:

an act of receiving, in the sending computing system, a request to send a message;

an act of placing the message, by the sending computing system, into a send queue;

an act of determining, by the sending computing system, that there is more than a predetermined threshold of data in the send queue when the message is included in the send queue;

in response to determining that there is more that the predetermined threshold of data in the send queue, an act of sending a plurality of packets, by the sending computing system, over a connection to the receiving computing system;

receiving, by the sending computing system, one or more acknowledgements corresponding to the plurality of packets sent;

after receiving each of the one or more acknowledgements, performing an act of evaluating, by the sending computing system, whether the amount of unacknowledged data in the send queue is less than or equal to the predetermined threshold, wherein when it is determined that the amount of unacknowledged data in the send queue is less than or equal to the predetermined threshold, the sending computing system further performing the following acts:

an act of copying the remaining data from the send queue into an internal buffer;

an act of responding to the request to send the message with an indication that transmission of the message is complete, and only after the act of responding to the request, an act of receiving a final acknowledgement from the receiving computing system acknowledging receipt of the final packet.

2. A method in accordance with claim 1, further comprising the following:

in response to receiving the final acknowledgement packet, an act of releasing resources associated with the copied data.

3. A method in accordance with claim 2, wherein the act of releasing resources associated with the copied data comprises the following:

an act of making sure that the copied data is no longer in the send queue.

4. A method in accordance with claim 2, wherein the act of releasing resources associated with the copied data comprises the following:

an act of freeing the internal buffers into which the remaining data was copied.

5. A method in accordance with claim 1, wherein the reliable communication protocol is Transmission Control Protocol (TCP).

6. A method in accordance with claim 1, wherein the reliable communication protocol comprises D-PLAY.

7. A method in accordance with claim 1, wherein the internal buffer comprises more than one buffer which collectively amount in size to no more than half of a maximum size of a packet as defined using the reliable communications protocol.

8. A method in accordance with claim 1, wherein the internal buffer comprises more than one buffer.

9. A method in accordance with claim 1, wherein the internal buffer comprises more than one buffer which collectively amount in size to less than a maximum size of a packet as defined using the reliable communications protocol.

10. A method in accordance with claim 1, wherein the internal buffer is no more in size than half of a maximum size of a packet as defined using the reliable communications protocol.

11. A method in accordance with claim 1, wherein the internal buffer is less in size than a maximum size of a packet as defined using the reliable communications protocol.

12. A computer program product for use in a network environment that includes a sending computing system and a receiving computing system that communicate with each other using a reliable communication protocol in which a message to be sent from the sending computing system to the receiving computing system is broken into a plurality of packets, and in which the receiving computing system acknowledges receipt of every two or more packets, the computer program product for implementing a method for the sending computing system to quickly, efficiently and reliably send the message to the receiving computing system notwithstanding that acknowledgement of the final packet is delayed, the computer program product comprising one or more physical computer-storage media having stored thereon computer-executable instructions that, when executed by one or more processors of the sending computing system, cause the sending computing system to perform the following:
 an act of receiving, in the sending computing system, a request to send a message;
 an act of placing the message, by the sending computing system, into a send queue;
 an act of determining, by the sending computing system, that the data in the send queue is more than a predetermined threshold when the message is included in the send queue;
 in response to determining that the data in the send queue is more than the predetermined threshold, an act of sending a plurality of packets, by the sending computing system, over a connection to the receiving computing system;
 receiving, by the sending computing system, one or more acknowledgements corresponding to the plurality of packets sent;
 after receiving each of the one or more acknowledgements, performing an act of determining, by the sending computing system, whether the amount of unacknowledged data in the send queue is less than or equal to the predetermined threshold
 wherein when it is determined that the amount of unacknowledged data in the send queue is less than the predetermined threshold, the sending computing system further performing the following acts:
 an act of copying the remaining data from the send queue into an internal buffer;
 an act of responding to the request to send the message with an indication that transmission of the message is complete; and
 only after the act of responding to the request, an act of receiving a final acknowledgement from the receiving computing system acknowledging receipt of the final packet.

13. A computer program product in accordance with claim 12, wherein the one or more computer-storage media further have thereon computer-executable instructions that, when executed by the one or more processors, cause the sending computing system to perform the following in response to receiving the final acknowledgement packet:
 an act of releasing resources associated with the copied data.

14. A computer program product in accordance with claim 13, wherein the act of releasing resources associated with the copied data comprises the following:
 an act of making sure that the copied data is no longer in the send queue.

15. A computer program product in accordance with claim 13, wherein the act of releasing resources associated with the copied data comprises the following:
 an act of freeing the internal buffers into which the remaining data was copied.

16. A computer program product in accordance with claim 12, wherein the one or more computer-storage media comprises volatile system memory.

17. A computer program product in accordance with claim 12, wherein the one or more computer-storage media comprises persistent memory.

18. In a network environment that includes a sending computing system and a receiving computing system that communicate with each other using a reliable communication protocol in which a message to be sent from the sending computing system to the receiving computing system is broken into a plurality of packets, and in which the receiving computing system acknowledges receipt of every two or more packets, a method for the sending computing system to quickly, efficiently and reliably send the message to the receiving computing system notwithstanding that acknowledgement of the final packet is delayed, the method comprising the following:
 an act of receiving, in the sending computing system, a request to send a message;
 an act of placing the message, by the sending computing system, into a send queue;
 an act of determining, by the sending computing system, that the data in the send queue is more than a predetermined threshold when the message is included in the send queue;
 in response to determining that the data in the send queue is more than the predetermined threshold, an act of sending a plurality of packets, by the sending computing system, over a connection to the receiving computing system;
 receiving, by the sending computing system, one or more acknowledgements corresponding to the packets sent in the act of sending the plurality of packets; and
 after receiving each of the one or more acknowledgements, performing an act of determining, by the sending computing system, whether the amount of unacknowledged data in the send queue is less than or equal to the predetermined threshold, wherein when it is determined that the amount of unacknowledged data in the send queue is less than or equal to a predetermined threshold, the sending computing system further performing a step for fulfilling the send request without waiting for a final acknowledgement.

19. A method in accordance with claim 18, wherein the step for fulfilling the send request without waiting for a final acknowledgement comprises the following:
 in response to determining the amount of unacknowledged data in the send queue is less than or equal to the predetermined threshold, an act of copying the remaining data into an internal buffer;
 an act of responding to the request to send the message with an indication that transmission of the message is complete; and only after the act of responding to the request, an act of receiving a final acknowledgement from the receiving computing system acknowledging receipt of the final packet.

20. In a network environment that includes a sending computing system and a receiving computing system that communicate with each other using a reliable communication protocol in which a message is sent from the sending computing system to the receiving computing system is broken into a plurality of packets, and in which the receiving computing system acknowledges receipt of every two or more packets, a method for the sending computing system to quickly, efficiently and reliably send the message to the receiving computing system notwithstanding that acknowledgement of the final packet is delayed, the method comprising the following:
- an act of receiving, in the sending computing system, a request to send a message;
- an act of placing the message, by the sending computing system, into a send queue;
- an act of determining, by the computing system, that the amount of data in the send queue is less than or equal to a predetermined threshold when the message is included in the send queue;
- in response to determining that the amount of data in the send queue is less than or equal to the predetermined threshold, the sending computing system performing the following:
  - an act of copying the data from the send queue into an internal buffer which amounts in size to a predetermined amount of data as defined by the reliable communications protocol;
  - an act of responding to the request to send the message with an indication that transmission of the message is complete; and
  - only after the act of responding to the request, an act of receiving an acknowledgement packet from the receiving computing system acknowledging receipt of the message.

21. A method in accordance with claim 20, further comprising the following:
- in response to receiving the acknowledgement packet, an act of releasing resources associated with the copied data.

22. A method in accordance with claim 20, wherein the reliable communication protocol is Transmission Control Protocol (TCP).

23. A method in accordance with claim 20, wherein the reliable communication protocol comprises D-PLAY.

24. A method in accordance with claim 20, wherein the internal buffer comprises more than one buffer which collectively amount in size to no more than half of a maximum size of a packet as defined using the reliable communications protocol.

25. A method in accordance with claim 20, wherein the internal buffer comprises more than one buffer.

26. A method in accordance with claim 20, wherein the internal buffer comprises more than one buffer which collectively amount in size to less than a maximum size of a packet as defined using the reliable communications protocol.

27. A method in accordance with claim 20, wherein the internal buffer is no more in size than half a maximum size of a packet as defined using the reliable communications protocol.

28. A method in accordance with claim 20, wherein the internal buffer is less in size than a maximum size of a packet as defined using the reliable communications protocol.

29. A computer program product for use in a network environment that includes a sending computing system and a receiving computing system that communicate with each other using a reliable communication protocol in which a message is sent from the sending computing system to the receiving computing system in a single packet, and in which the receiving computing system acknowledges receipt of every two or more packets, the computer program product for implementing a method for the sending computing system to quickly, efficiently and reliably send the message to the receiving computing system notwithstanding that final acknowledgement may be delayed, the computer program product comprising one or more computer-storage media having stored thereon computer-executable instructions that, when executed by one or more processors of the sending computing system, cause the sending computing system to perform the following:
- an act of receiving, in the computing system, a request to send a message;
- an act of placing the message, by the sending computing system, into a send queue;
- an act of determining, by the sending computing system, that the amount of data in the send queue is less than or equal to a predetermined threshold when the message is included in the send queue;
- in response to determining that the amount of data in the send queue is less than or equal to the predetermined threshold, the sending computing system performing the following:
  - an act of copying the data from the send queue into an internal buffer which amounts in size to a predetermined amount of data as defined by the reliable communications protocol;
  - an act of responding to the request to send the message with an indication that transmission of the message is complete; and
  - only after the act of responding to the request, an act of receiving an acknowledgement packet from the receiving computing system acknowledging receipt of the message.

30. A computer program product in accordance with claim 29, wherein the one or more computer-storage media further have thereon computer-executable instructions that, when executed by the one or more processors, cause the sending computing system to perform the following in response to receiving the acknowledgement packet:
- an act of releasing resources associated with the copied data.

31. A computer program product in accordance with claim 30, wherein the one or more computer-storage media comprises volatile system memory.

32. A computer program product in accordance with claim 30, wherein the one or more computer-storage media comprises persistent memory.

33. In a network environment that includes a sending computing system and a receiving computing system that communicate with each other using a reliable communication protocol in which a message is sent from the sending computing system to the receiving computing system is broken into a plurality of packets, and in which the receiving computing system acknowledges receipt of every two or more packets, a method for the sending computing system to quickly, efficiently and reliably send the message to the receiving computing system notwithstanding that acknowledgement of the final packet is delayed, the method comprising the following:
- an act of receiving, in the sending computing system, a request to send a message;
- an act of placing the message, by the sending computing system, into a send queue;

an act of determining, by the sending computing system, that the amount of data in the send queue is less than or equal to a predetermined threshold when the message is included in the send queue; and in response to determining that the amount of data in the send queue is less than or equal to the predetermined threshold, the sending computing system performing a step for fulfilling the send request without waiting for an acknowledgement.

34. A method in accordance with claim 33, wherein the step for fulfilling the send request without waiting for an acknowledgement further comprises the following:

an act of responding to the request to send the message with an indication that transmission of the message is complete; and only after the act of responding to the request, an act of receiving an acknowledgement packet from the receiving computing system acknowledging receipt of the packet.

35. A computer program product for use in a network environment that includes a sending computing system and a receiving computing system that communicate with each other using a reliable communication protocol in which a message is sent from the sending computing system to the receiving computing system in a single packet, and in which the receiving computing system acknowledges receipt of every two or more packets, the computer program product for implementing a method for the sending computing system to quickly, efficiently and reliably send the message to the receiving computing system notwithstanding that final acknowledgement may be delayed, the computer program product comprising one or more computer-storage media having stored thereon computer-executable instructions that, when executed by one or more processors of the sending computing system, cause the sending computing system to perform the following:

an act of receiving, in the sending computing system, a request to send a message;

an act of placing the message, by the sending computing system, into a send queue;

an act of determining, by the sending computing system, that the amount of data in the send queue is less than or equal to a predetermined threshold when the message is included in the send queue; and in response to determining that the amount of data in the send queue is less than or equal to the predetermined threshold, the sending computing system performing a step for fulfilling the send request without waiting for an acknowledgement.

* * * * *